United States Patent
Yonezawa et al.

(10) Patent No.: US 10,401,542 B2
(45) Date of Patent: Sep. 3, 2019

(54) INFRARED LIGHT SHIELDING LAMINATE AND INFRARED LIGHT SHIELDING MATERIAL USING SAME

(71) Applicant: MITSUBISHI MATERIALS CORPORATION, Tokyo (JP)

(72) Inventors: Takehiro Yonezawa, Naka (JP); Kazuhiko Yamasaki, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 0 days.

(21) Appl. No.: 15/511,454

(22) PCT Filed: Dec. 18, 2015

(86) PCT No.: PCT/JP2015/085496
§ 371 (c)(1),
(2) Date: Mar. 15, 2017

(87) PCT Pub. No.: WO2016/104365
PCT Pub. Date: Jun. 30, 2016

(65) Prior Publication Data
US 2017/0307792 A1 Oct. 26, 2017

(30) Foreign Application Priority Data
Dec. 22, 2014 (JP) .................. 2014-258618

(51) Int. Cl.
*G02B 5/20* (2006.01)
*G02B 5/26* (2006.01)
(Continued)

(52) U.S. Cl.
CPC ............... *G02B 5/208* (2013.01); *B32B 5/16* (2013.01); *B32B 17/10018* (2013.01);
(Continued)

(58) Field of Classification Search
CPC .. G02B 5/208; G02B 1/14; G02B 5/26; B32B 5/16; B32B 17/10018; B32B 17/10036;
(Continued)

(56) References Cited

U.S. PATENT DOCUMENTS 6,191,884 B1 * 2/2001 Takizawa ............... G02B 5/208
252/582
7,629,040 B2 * 12/2009 Yaoita ............... B32B 17/10036
359/359

(Continued)

FOREIGN PATENT DOCUMENTS

CN 101243022 A 8/2008
CN 102083753 A 6/2011
(Continued)

OTHER PUBLICATIONS

Katagiri et al. "Robust Infrared-Shielding Coating Films Prepared Using Perhydropolysilazane and Hydrophobized Indium Tin Oxide Nanoparticles with Tuned Surface Plasmon Resonance" ACS Appl. Mater. Interfaces, pp. 10240-10245, vol. 5, 2013.*
(Continued)

*Primary Examiner* — George G King
(74) *Attorney, Agent, or Firm* — Locke Lord LLP (57) ABSTRACT

This infrared light shielding laminate includes: an ITO particle-containing layer; and an overcoat layer which covers an upper surface of the ITO particle-containing layer, wherein core shell particles are present in a state of being in contact with each other in the ITO particle-containing layer, and the core shell particle includes an ITO particle serving as a core and an insulating material serving as a shell that covers the core.

14 Claims, 1 Drawing Sheet

(51) Int. Cl.
*G02B 1/14* (2015.01)
*B32B 5/16* (2006.01)
*B32B 17/10* (2006.01)
*B32B 27/08* (2006.01)
*B32B 27/36* (2006.01)
*C03C 17/34* (2006.01)
*C03C 17/42* (2006.01)

(52) U.S. Cl.
CPC .. *B32B 17/10036* (2013.01); *B32B 17/10633* (2013.01); *B32B 17/10733* (2013.01); *B32B 17/10743* (2013.01); *B32B 17/10761* (2013.01); *B32B 27/08* (2013.01); *B32B 27/36* (2013.01); *C03C 17/3417* (2013.01); *C03C 17/42* (2013.01); *G02B 5/26* (2013.01); *B32B 2250/02* (2013.01); *B32B 2250/03* (2013.01); *B32B 2255/04* (2013.01); *B32B 2255/26* (2013.01); *B32B 2255/28* (2013.01); *B32B 2260/025* (2013.01); *B32B 2260/046* (2013.01); *B32B 2264/102* (2013.01); *B32B 2307/206* (2013.01); *B32B 2307/412* (2013.01); *B32B 2307/416* (2013.01); *B32B 2419/00* (2013.01); *B32B 2605/006* (2013.01); *C03C 2217/45* (2013.01); *C03C 2217/476* (2013.01); *C03C 2217/48* (2013.01); *G02B 1/14* (2015.01)

(58) Field of Classification Search
CPC ........ B32B 17/10633; B32B 17/10733; B32B 17/10743; B32B 17/10761; B32B 27/08; B32B 27/36; B32B 2250/02; B32B 2250/03; B32B 2255/04; B32B 2255/26; B32B 2255/28; B32B 2260/025; B32B 2260/046; B32B 2264/102; B32B 2307/206; B32B 2307/412; B32B 2307/416; B32B 2419/00; B32B 2605/006; C03C 17/3417; C03C 17/42; C03C 2217/45; C03C 2217/476; C03C 2217/48
USPC ........................................................ 359/359
See application file for complete search history.

(56) References Cited

U.S. PATENT DOCUMENTS

| | | | |
|---|---|---|---|
| 2005/0129947 A1* | 6/2005 | Peng | B82Y 15/00 428/403 |
| 2011/0094416 A1* | 4/2011 | Kawai | B82Y 30/00 106/287.1 |
| 2011/0274622 A1* | 11/2011 | Texier-Nogues | A61K 9/0019 424/9.1 |
| 2013/0258456 A1* | 10/2013 | Hashimura | G02B 5/208 359/359 |

FOREIGN PATENT DOCUMENTS

| | | |
|---|---|---|
| EP | 2305607 A1 | 4/2011 |
| JP | 07-315874 A | 12/1995 |
| JP | 2004-217432 A | 8/2004 |
| JP | 2006-184313 A | 7/2006 |
| JP | 2012-219007 A | 11/2012 |
| JP | 2014-044301 A1 | 3/2014 |
| JP | 2014-070246 A | 4/2014 |
| JP | 2014-194446 A | 10/2014 |
| WO | 2010/004814 A1 | 1/2010 |
| WO | 2014/178180 A1 | 11/2014 |

OTHER PUBLICATIONS

Tao et al. "Preparation and Optical Properties of Indium Tin Oxide/Epoxy Nanocomposites with Polyglycidyl Methacrylate Grafted Nanoparticles" ACS Appl. Mater. Interfaces pp. 3638-3645, vol. 3, 2011.*
Hiroaki Matsui et al., "Localized Surface Plasmons in In2O3: Sn nanoparticles and Their Near-Infrared Applications," Lecture proceeding of the 75th JSAP Autumn Meeting (autumn of 2014, Hokkaido University) and English abstract thereof.
International Search Report dated Mar. 15, 2016, issued for PCT/JP2015/085496 and English translation thereof.
Office Action dated Oct. 31, 2018, issued for the Chinese patent application No. 201580052682.3 and English translation thereof.
Office Action dated May 1, 2018, issued for the Japanese patent application No. 2014-258618 and English translation thereof.
Office Action dated Dec. 4, 2018, issued for the Japanese patent application No. 2014-258618 and English translation thereof.
Hiroaki Matsui et al., "Plasmonic-Field Interactions at Nanoparticle Interfaces for Infrared Thermal-Shielding Applications Based on Transparent Oxide Semiconductors" ACS Applied Materials & Interfaces, vol. 8, 2016, pp. 11749-11757 (cited dated Apr. 4, 2019 Office Action issued for EP15872933.5).
Office Action dated Apr. 4, 2019, issued for the European patent application No. 15872933.5.

* cited by examiner

INFRARED LIGHT SHIELDING LAMINATE AND INFRARED LIGHT SHIELDING MATERIAL USING SAME

TECHNICAL FIELD

The present invention relates to an infrared light shielding laminate with a high reflectance of near infrared light in which an ITO particle-containing layer is protected, and an infrared light shielding material using the same. In the specification of the present application, ITO indicates indium tin oxide.

The present application claims priority on Japanese Patent Application No. 2014-258618 filed on Dec. 22, 2014, the content of which is incorporated herein by reference.

BACKGROUND ART

In the related art, there are three types of infrared light shielding laminates. Firstly, an infrared light shielding laminate is disclosed (for example, see Patent Document 1), and the infrared light shielding laminate includes a transparent dielectric layer, an infrared reflective layer, and a transparent dielectric layer in this order, and each transparent dielectric layer mainly consists of zinc oxide and the infrared reflective layer mainly consists of silver. A glass laminate having a heat-ray reflective film (infrared light shielding laminate) which consists of such a laminate and is formed on a glass surface has a film surface with a low emissivity, and therefore, the glass laminate is referred to as low emissivity glass (Low-E glass).

Secondly, an infrared light shielding laminate is disclosed (for example, see Patent Document 2), and the infrared light shielding laminate includes a thin base film consisting of ITO or the like, a thin metal film mainly containing Ag, and a thin protective film consisting of $SnO_2$ or the like in this order on the surface of a glass substrate, and these thin films are formed using a sputtering method. A heat-ray shielding glass which includes a glass substrate and the above-described infrared light shielding laminate formed on the surface of the glass substrate has a thin Ag film with excellent transparency to visible light and excellent reflectance of near infrared light and also has excellent durability.

Thirdly, an infrared light shielding laminate is disclosed (for example, see Patent Document 3), and the infrared light shielding laminate includes: a heat-ray reflective film that is formed on at least one surface of a glass substrate and has a layer containing silver as a main component; and a heat insulation protective film formed on the surface of the heat-ray reflective film. The heat insulation protective film includes a matrix containing silicon oxide as a main component and an infrared absorbent dispersed in the matrix. The infrared absorbent consists of fine particles of an inorganic compound such as ITO, ATO, $LaB_6$, or the like. The fine particles of the inorganic compound are nanoparticles having an average primary particle diameter of 100 nm or less. The infrared light shielding laminate has wear resistance and moisture resistance and exhibits heat shielding properties.

With regard to an ITO particle film in which ITO particles are not in contact with each other but adjacent to each other, a phenomenon occurring when light in a near infrared region and an infrared region is incident on the ITO particle film (the light enters the ITO particle film) has been published (for example, Non-Patent Document 1). The electric field of surface plasmons excited by the light is strengthened due to near field effects occurring within the distance between particles. The plasmon resonance light is radiated so that reflection occurs. From this publication, approaches are presented for new research and development of a blocking technique of heat rays having high reflection performance by controlling the spatial arrangement of nanoparticles and the light phenomenon of the near field.

However, the infrared light shielding laminate disclosed in Patent Document 1 is colored and has a low light transmittance. Therefore, there is a problem in that the infrared light shielding laminate is not suitable for applications for products with a limited transmittance such as windshields of automobiles.

The infrared light shielding laminate disclosed in Patent Document 2 reflects near infrared light. Accordingly, the infrared light shielding laminate has more excellent thermal insulation characteristics than the infrared light shielding laminate disclosed in Patent Document 3. However, since the infrared light shielding laminate of Patent Document 2 is a continuous film having a low resistance, radio waves are also shielded. For this reason, radio waves of an electronic toll collection system (ETC) and mobile phones are absorbed and reflected and this may cause communication failure. This problem can be overcome by patterning the infrared light shielding laminate through etching, but the production process is complicated and thus the cost is high.

The infrared light shielding laminate disclosed in Patent Document 3 is more excellent than the infrared light shielding laminates of Patent Documents 1 and 2 from the viewpoints of the transmittance of visible light, radio wave transparency, and simplicity of the production process. However, since nanoparticles absorb infrared light, the total thermal insulation characteristics of the infrared light shielding laminate of Patent Document 3 are not superior to those of the infrared light shielding laminates of Patent Documents 1 and 2, and there are problems to be further improved.

In the ITO particle film disclosed in Non-Patent Document 1, spatially arranged nanoparticles are easily peeled off from the film. Therefore, problems still remain in practical use of the film.

PRIOR ART DOCUMENTS

Patent Documents

Patent Document 1: Japanese Unexamined Patent Application, First Publication No. 2004-217432 (claims 1 and 9 and paragraph [0002])

Patent Document 2: Japanese Unexamined Patent Application, First Publication No. H07-315874 (claim 2 and paragraphs [0005], [0014], [0017], and [0023] to [0031])

Patent Document 3: Japanese Unexamined Patent Application, First Publication No. 2012-219007 (claims 1 and 2 and paragraphs [0001] and [0033])

Non-Patent Document

Non-Patent Document 1: "Localized Surface Plasmons in $In_2O_3$: Sn nanoparticles and Their Near-Infrared Applications" written by Hiroaki Matsui et al., lecture proceeding of the 75th JSAP Autumn Meeting (autumn of 2014, Hokkaido University)

DISCLOSURE OF THE INVENTION

Problems to be Solved by the Invention

An object of the present invention is to provide an infrared light shielding laminate with a high reflectance of near infrared light, in which an ITO particle-containing layer is protected, and an infrared light shielding material using the same.

Means for Solving the Problem

Figure 1:
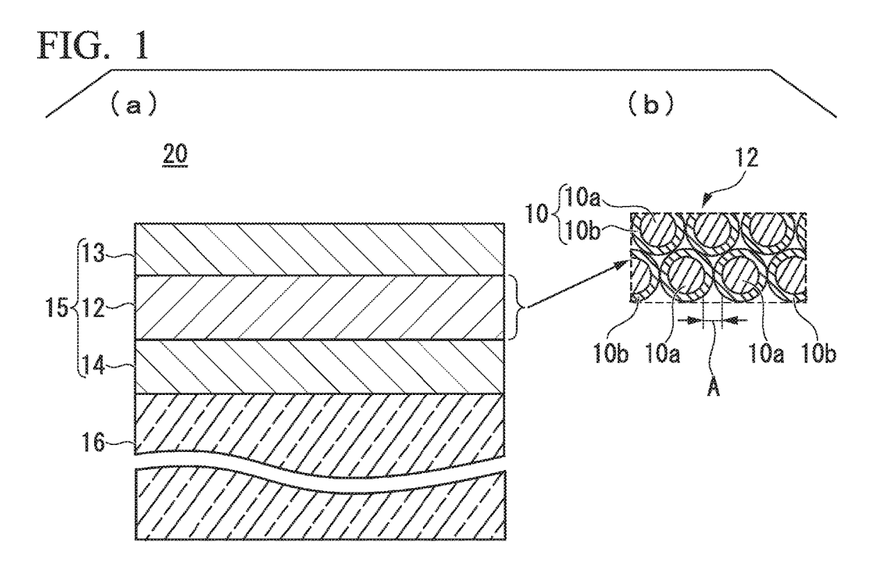
FIG. 1(a) is a cross-sectional view of an infrared light shielding material in which an infrared light shielding laminate of the present embodiment is formed on a base material.
FIG. 1(b) is an enlarged cross-sectional view of an ITO particle-containing layer.

One aspect of the present invention is described below and features are denoted by the reference numerals shown in FIGS. 1 and 2.

(1) An infrared light shielding laminate 15 including: an ITO particle-containing layer 12; and an overcoat layer 13 which covers an upper surface (first surface) of the ITO particle-containing layer 12, wherein core shell particles 10 and 10 are present in a state of being in contact with each other in the ITO particle-containing layer 12, and the core shell particle 10 includes an ITO particle 10a serving as a core and an insulating material 10b serving as a shell that covers the core.

(2) The infrared light shielding laminate 15 according to (1), wherein an average value of a distance A between the ITO particles 10a and 10a in a state in which the core shell particles 10 and 10 are in contact with each other is in a range of 0.5 to 10 nm.

(3) The infrared light shielding laminate 15 according to (1) or (2), further including: a base coat layer 14 which covers a lower surface (second surface) of the ITO particle-containing layer 12, wherein the ITO particle-containing layer 12 is interposed between the overcoat layer 13 and the base coat layer 14.

(4) The infrared light shielding laminate 15 according to (1) or (3), wherein the overcoat layer 13 is a layer that contains silica, an acrylic resin, an epoxy resin, or a polyvinyl acetal resin.

(5) The infrared light shielding laminate 15 according to (3), wherein the base coat layer 14 is a layer that contains silica, a urethane resin, an acrylic resin, an epoxy resin, or a polyvinyl acetal resin.

(6) The infrared light shielding laminate 15 according to (1), wherein the insulating material 10b is silica, alumina, or an organic protective agent.

(7) An infrared light shielding material 20 including: the infrared light shielding laminate 15 according to any one of (1) to (6); and a transparent base material 16, wherein the infrared light shielding laminate 15 is provided on the transparent base material 16 in a state in which a surface of the infrared light shielding laminate 15 on a side opposite to the overcoat layer 13 is in contact with the transparent base material 16.

(8) An infrared light shielding material 30 including: the infrared light shielding laminate 15 according to any one of (1) to (6); and two transparent base materials 16 and 17, wherein the infrared light shielding laminate 15 is interposed between the two transparent base materials 16 and 17.

(9) The infrared light shielding materials 20 and 30 according to (7) or (8), wherein the transparent base materials 16 and 17 are glass substrates or plastic sheets.

EFFECTS OF THE INVENTION

In the infrared light shielding laminate of the aspect (1) of the present invention, the core shell particles 10 and 10 are in contact with each other in the ITO particle-containing layer 12 as illustrated in FIG. 1(b). In other words, the ITO particles 10a and 10a are present in a state of interposing the insulating materials 10b and 10b therebetween. Therefore, the ITO particles 10a and 10a are closely disposed at the distance A between particles. The distance A between particles is a value which is twice the thickness of a shell consisting of the insulating material 10b. In the case where the thickness of the shell is constant, the ITO particles 10a and 10a are disposed in a state in which a constant distance A between particles is maintained. The contact between the ITO particles 10a and 10a which are conductive particles is prevented by the insulating materials 10b and 10b so that the ITO particle-containing layer 12 is not a conductive layer anymore and exhibits radio wave transparency. When the infrared light shielding laminate 15 is irradiated with light in a near infrared and infrared region, the light is transmitted through the overcoat layer 13 and is incident on the ITO particle-containing layer 12 (the light enters the ITO particle-containing layer 12). In the ITO particle-containing layer 12, the electric field of surface plasmons excited by the light is strengthened due to near field effects occurring within the distance between particles, and then the plasmon resonance light is radiated so that reflection occurs. Since the ITO particle-containing layer 12 is covered and protected by the overcoat layer 13, the infrared light shielding laminate 15 has the practical strength. Further, since the ITO particle-containing layer 12 includes the overcoat layer 13, it is possible to prevent the core shell particles 10 from being peeled off from the ITO particle-containing layer 12.

According to the aspect (2) of the present invention, as illustrated in FIG. 1(b), the average value of the distance A between ITO particles in a state in which the core shell particles 10 and 10 are in contact with each other, that is, the average value of the distance A between the surfaces of ITO particles 10a and 10a adjacent to each other is in a range of 0.5 to 10 nm. Due to this, the electric field of surface plasmons of the above-described particles is easily strengthened within the distance between particles. As a result, the plasmon resonance light is further radiated and easily reflected. In the case where the distance A between particles is less than 0.5 nm, the particles cannot be physically separated from each other and thus the strengthening effects are unlikely to be obtained. Meanwhile, in the case where the distance A between particles is more than 10 nm, seeping light locally present on the particle surfaces do not overlap with each other and thus the strengthening effects are unlikely to be obtained. Due to this, sufficient reflectance is unlikely to be obtained.

According to the aspect (3) of the present invention, as illustrated in FIG. 1(a), the ITO particle-containing layer 12 of the infrared light shielding laminate 15 is interposed between the overcoat layer 13 and the base coat layer 14. Therefore, the strength of the infrared light shielding laminate 15 can be further improved.

According to the aspect (4) of the present invention, a layer containing silica, an acrylic resin, an epoxy resin, or a polyvinyl acetal resin is used as the overcoat layer 13. Due to this, the overcoat layer 13 is transparent and has excellent strength and thus serves as a protective layer that protects the ITO particle-containing layer 12.

According to the aspect (5) of the present invention, a layer containing silica, a urethane resin (polyurethane resin), an acrylic resin, an epoxy resin, or a polyvinyl acetal resin is used as the base coat layer 14. Due to this, the base coat layer 14 is transparent and has excellent strength and thus serves as a protective layer that protects the ITO particle-containing layer 12.

According to the aspect (6) of the present invention, silica, alumina, or an organic protective material is used as the insulating material 10b. Due to this, the surface of each ITO particle 10a can be covered by the insulating material 10b. Therefore, insulation properties can be imparted to each ITO particle 10a. In addition, the distance A between the ITO particles 10a and 10a can be maintained. In other words, the ITO particles 10a and 10a may be present (disposed) in a state in which a constant distance A between particles is maintained (the distance A between particles is constantly maintained).

In the infrared light shielding material 20 according to the aspect (7) of the present invention, as illustrated in FIG. 1(a), the infrared light shielding laminate 15 is formed on the upper surface of the transparent base material 16. Accordingly, the infrared light shielding material 20 can be widely used for the purpose of shielding infrared light.

Figure 2:
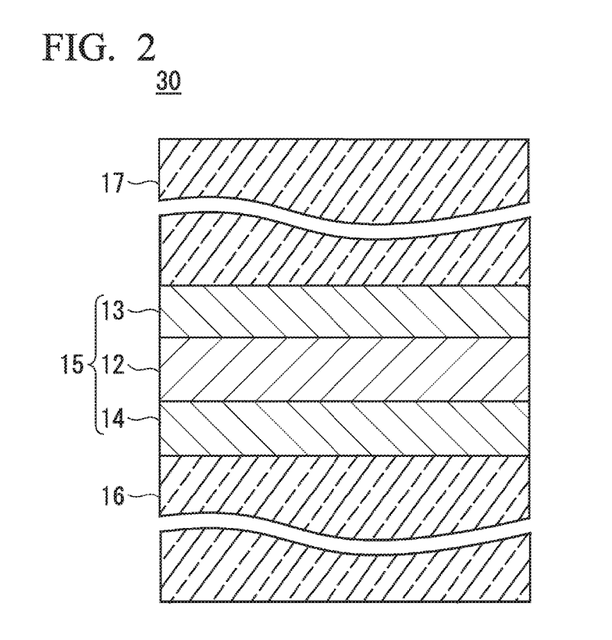
FIG. 2 is a cross-sectional view of the infrared light shielding material in which the infrared light shielding laminate of the present embodiment is interposed between two base materials.

In the infrared light shielding material 30 according to the aspect (8) of the present invention, as illustrated in FIG. 2, the infrared light shielding laminate 15 is interposed between two transparent base materials 16 and 17. Therefore, in the infrared light shielding material 30, the effect of shielding infrared light is not impaired even in a high-humidity environment.

In the infrared light shielding materials 20 and 30 according to the aspect (9) of the present invention, a glass substrate or a plastic sheet is used as the transparent base materials 16 and 17. In this manner, the infrared light shielding laminate 15 can be stably supported.

EMBODIMENTS FOR CARRYING OUT THE INVENTION

Next, an embodiment of the present invention will be described with reference to FIGS. 1 and 2.

An infrared light shielding laminate 15 of the present embodiment includes a base coat layer 14, an ITO particle-containing layer 12, and an overcoat layer 13 in this order.

Among two main surfaces of the ITO particle-containing layer 12, a main surface on which light is incident is an upper surface (first surface) and a main surface facing the upper surface is the lower surface (second surface). Further, the terms of the upper surface and the lower surface are not intended to define the vertical position of the infrared light shielding laminate 15 at the time of using the infrared light shielding laminate 15.

The overcoat layer 13 is provided so as to be in contact with the upper surface of the ITO particle-containing layer 12 and covers the upper surface of the ITO particle-containing layer 12. The base coat layer 14 is provided so as to be in contact with the lower surface of the ITO particle-containing layer 12 and covers the lower surface of the ITO particle-containing layer 12. In other words, the ITO particle-containing layer 12 is provided on the base coat layer 14 and the overcoat layer 13 is provided on the ITO particle-containing layer 12.

Light radiated to the infrared light shielding laminate 15 is incident on the upper surface (first surface) of the overcoat layer 13 and is transmitted through the overcoat layer 13. In addition, the light is incident on the upper surface of the ITO particle-containing layer 12. The upper surface of the overcoat layer 13 on which the light is incident is referred to as the upper surface (first surface) of the infrared light shielding laminate 15 and the lower surface (second surface) of the base coat layer 14 is referred to as the lower surface (second surface) of the infrared light shielding laminate 15. Further, in the case where the infrared light shielding laminate 15 does not include the base coat layer 14, the lower surface of the ITO particle-containing layer 12 is referred to as the lower surface of the infrared light shielding laminate 15.

The ITO particle-containing layer 12 contains core shell particles 10, and the core shell particles 10 are present in a state in which the core shell particles 10 and 10 are in contact with each other. The core shell particle 10 includes an ITO particle 10a serving as a core and an insulating material 10b serving as a shell that covers the core. In the present embodiment, the core shell particle 10 consists of the ITO particle 10a and the insulating material 10b.

The ITO particle-containing layer 12 may further contain a component constituting the overcoat layer 13 described below. In this case, the component constituting the overcoat layer 13 is present in a gap between the core shell particles 10 and 10. Specifically, the surface portion of the upper surface of the ITO particle-containing layer 12 in direct contact with the overcoat layer 13 contains the component constituting the overcoat layer 13. When the overcoat layer 13 is formed on the upper surface of the ITO particle-containing layer 12 according to the following method, the component constituting the overcoat layer 13 infiltrates into the gap between the core shell particles 10 and 10 in the surface portion of the upper surface of the ITO particle-containing layer 12. In this manner, the component constituting the overcoat layer 13 is present in the gap between the core shell particles 10 and 10 in the surface portion of the upper surface of the ITO particle-containing layer 12. Thereby, the adhesiveness of the overcoat layer 13 to the ITO particle-containing layer 12 is improved. Further, it is also possible to prevent the core shell particle 10 from being peeled off from the ITO particle-containing layer 12.

[ITO Particles]

In the case where the infrared light shielding laminate 15 needs to allow visible light to be transmitted therethrough, the average primary particle diameter of the ITO particles 10a is in a range of 5 to 100 nm and preferably 20 nm or less. In the case where the infrared light shielding laminate 15 does not need to be transparent like a wall or a roof, the average primary particle diameter of the ITO particles 10a is in a range of 5 to 200 nm and preferably 50 nm or less.

With regard to the Sn doping amount of ITO particles, the molar ratio of Sn to Sn and In, Sn/(Sn+In) is in a range of 0.01 to 0.25 and particularly preferably in a range of 0.04 to 0.15.

The shape of the ITO particle 10a is not particularly limited. However, for the purpose of obtaining plasmon resonance effects, cubic or spherical particles with a small particle diameter and small anisotropy are preferable.

The ITO particles 10a are typically prepared using the following method. A hydroxide of In and Sn is coprecipitated by reacting an aqueous solution containing water-soluble salts of In and a small amount of Sn with an alkali. This coprecipitate is heated and calcined (sintered) in the air to obtain an oxide. Instead of the coprecipitate, a mixture of hydroxides and/or oxides of In and Sn can also be used as a raw material to be heated and calcined. In the present embodiment, ITO particles produced by such a conventional method or ITO particles which are commercially available as conductive nanoparticles can be used as they are.

[Formation of Core Shell Particles]

Next, as illustrated in the enlarged view of FIG. 1(b), the core shell particle 10 including the ITO particle 10a as a core and the insulating material 10b as a shell that covers the core will be described.

The ITO particle 10a serving as a core is covered by the insulating material 10b serving as a shell, and the insulating material 10b is silica, alumina, or an organic protective material.

The core shell particles 10 are prepared by the following method.

First, ITO particles are added to a solvent, and an amount (mass) of the ITO particles is approximately the same as the amount (mass) of the solvent. The ITO particles are dispersed using a bead mill to obtain a dispersion liquid of ITO particles. The dispersion liquid is diluted with the same solvent as the above-described solvent and the solid content concentration of ITO is set to be in a range of 0.01% to 5% by mass.

In the case where the insulating material is an inorganic material such as silica or alumina, water and/or alcohol is used as the solvent. Examples of the alcohol include methanol, ethanol, propanol, isopropanol, butanol, hexanol, and cyclohexanol, and one or more selected therefrom can be used. Further, a mixed solvent of water and alcohol can also be used.

In the case where the insulating material is an organic protective material, ITO particles covered by the organic protective material are obtained by the following manner. Fatty acid salts of indium and tin are used as the raw material and ITO particles are prepared according to a hot soap method. Alternatively, when the ITO particles prepared by the above-described coprecipitation method are dispersed in a solvent, a dispersant is added thereto to disperse the ITO particles. In this manner, ITO particles covered by the organic protective material can be obtained.

The shell of the present embodiment is not particularly limited to those obtained by covering a core in a layered shape and examples of the shell include those obtained by bonding one end of an organic protective material to the entire surface of the core as an anchor, releasing the other end of the organic protective material from the core surface, and radially covering the core surface using the organic protective material.

(a) In the case where ITO particles are covered by silica, tetraethyl orthosilicate, a methoxysilane oligomer, or an ethoxysilane oligomer is added as a silica source to the diluted dispersion liquid and then the solution is mixed. In the case where the mixed solution is acidic, an alkali such as NaOH, KOH, or $NH_3$ is added as a polymerization catalyst to the mixed solution so that the silica source is polymerized. The neutralized mixed solution is washed with ultra-pure water and subjected to solid-liquid separation, and the solid content is dried. The dried solid content is calcined at a temperature of 100° C. to 500° C. for 1 to 60 minutes in an inert gas atmosphere. Thereby, particles in which an ITO particle is covered by a silica film are formed.

Further, the mixed solution is washed by the following method so that impurities are removed from the mixed solution. First, the dispersion liquid is centrifuged using a centrifugal separator to remove coarse impurities. Next, the mixed solution is filtered using a filter made of an ion exchange resin to remove ionic impurities.

(b) In the case where ITO particles are covered by alumina, while the diluted dispersion liquid is stirred, a diluted sulfuric acid aqueous solution is added thereto so that the pH thereof is adjusted to be in a range of 3.5 to 4.5; and thereby, a suspension is obtained. Next, a predetermined amount of an aluminum sulfate aqueous solution is gradually added to the suspension and then the solution is sufficiently mixed. A sodium hydroxide aqueous solution is gradually added while the solution is continuously stirred so that the pH of the suspension is adjusted to be in a range of 5 to 7. Then, the suspension is stirred (aged) while the temperature is held to a constant value; and thereby, hydrated alumina-covered ITO particles (particles in which an ITO particle is covered by hydrated alumina) are obtained. The obtained hydrated alumina-covered ITO particles are washed, subjected to solid-liquid separation, and dried. In this manner, hydrated alumina-covered ITO particles can be obtained.

Moreover, the hydrated alumina of a shell can be changed into alumina by heating the hydrated alumina-covered ITO particles at a temperature of 550° C. or higher.

(c) In the case where a dispersant is added to disperse ITO particles in a solvent; and thereby, the ITO particles are covered by an organic protective material, the following method is performed. When ITO particle prepared by the coprecipitation method or the like are dispersed in a solvent, a dispersant is added thereto to disperse the ITO particles. In this manner, ITO particles covered by an organic protective material are formed. In this case, the organic protective agent which is an insulating material is a dispersant adhered to the surface of the ITO particle. As the dispersant, an organic compound having an acidic adsorptive group is preferable and examples thereof include an acrylic polymer having a carboxyl group at the terminal. Preferred examples of commercially available dispersants include SOLSPERSE 36000, SOLSPERSE 41000, or SOLSPERSE 43000 (all manufactured by Lubrizol Corporation).

(d) In the case where ITO particles covered by an organic protective material are prepared using a hot soap method, fatty acid salts of indium and tin are used as a raw material and these raw materials are dissolved in an organic solvent. Next, the organic solvent is volatilized and the mixture of fatty acid salts of indium and tin is thermally decomposed in a temperature range of 200° C. to 500° C. In this manner, ITO particles covered by an organic protective material are formed. In this case, the organic protective agent which is an insulating material is an organic compound obtained by thermally decomposing a fatty acid in the fatty acid salts of indium and tin or a fatty acid remaining without thermal decomposition. The thickness of the shell consisting of the insulating material can be adjusted by changing the carbon chain of the fatty acid. Therefore, a particle interval (distance between particles) A can be adjusted and the number of carbon atoms in the fatty acid is preferably in a range of 4 to 30. Examples of the fatty acid include decanoic acid and stearic acid.

[Thickness of Shell Consisting of Insulating Material]

In the cases of (a) to (c), the thickness of the shell consisting of the insulating material 10b that covers the ITO particle 10a is adjusted according to each blending amount of the ITO particles and the insulating material at the time when the ITO particles are covered by the insulating material. Specifically, the average value of the thicknesses of the shells is adjusted to be in a range of 0.25 to 5 nm by setting the amount of the insulating material to be in a range of 0.3 to 800 parts by mass with respect to 100 parts by mass of the ITO particles. The average value of the thicknesses of the shells is preferably in a range of 1 to 3 nm and more preferably in a range of 1.5 to 2.5 nm. A value twice the thickness of the shell corresponds to the distance A between the ITO particles 10a and 10a (see the enlarged view of FIG. 1(b)).

[Formation of Base Coat Layer]

The base coat layer 14 is a layer that contains silica, a urethane resin (polyurethane resin), an acrylic resin, an epoxy resin, or a polyvinyl acetal resin and is prepared by the following method.

One solution selected from a monomer solution of silica ($SiO_2$), an oligomer solution of silica, a silica sol gel solution, a silica dispersion liquid, a solution of a urethane resin, a solution of an acrylic resin, a solution of an epoxy resin, and a solution of a polyvinyl acetal resin is coated on the upper surface of a base material 16 such as a transparent glass substrate or a plastic sheet to form a coated film. The base coat layer 14 is formed by drying this coated film. The coating can be conducted using a typical coating device such as a slot die coater, a spin coater, an applicator, or a bar coater. The coated film is dried at a temperature of 20° C. to 80° C. in the air. The specific method of forming the base coat layer 14 is the same as the following method of forming the overcoat layer 13.

In order to protect the ITO particle-containing layer, the thickness of the base coat layer 14 is in a range of 0.1 to 100 μm, preferably in a range of 1 to 20 μm, and more preferably in a range of 5 to 10 μm.

Further, examples of the plastic sheet serving as the base material 16 include a plastic film.

The silica sol gel solution used to form the base coat layer is prepared by the following method.

Tetraethyl orthosilicate, a methoxysilane oligomer, or an ethoxysilane oligomer is added as a silica source to a mixed solvent of water and alcohol, and then mixed. An acid such as nitric acid, citric acid, or the like is added to the mixed solution, and then a reaction is carried out for 0.5 to 6 hours; and thereby, a silica sol gel solution is prepared.

A solution of a urethane resin, an acrylic resin, an epoxy resin, or a polyvinyl acetal resin used to form the base coat layer contains one of these resins and a solvent in which the resin is soluble. As the solvent, alcohol is preferable. The concentration of the resin in the solution varies depending on the viscosity of the solution to be required, but is preferably in a range of 10% to 50% by mass.

[Formation of ITO Particle-Containing Layer]

As described above, the core shell particle 10 includes the ITO particle 10a and the insulating material 10b that covers the ITO particle 10a, and the insulating material 10b is silica, alumina, or an organic protective material. The core shell particles 10 are added to a solvent of water and alcohol. The core shell particles 10 are dispersed in the solvent using an ultrasonic homogenizer or the like. In this manner, a dispersion liquid of the core shell particles 10 is obtained. The dispersion liquid is coated on the upper surface of the base coat layer 14 to form a coated film. Next, the coated film is dried. In this manner, the ITO particle-containing layer 12 is formed.

A spin coating method is preferable as the coating method. The drying is conducted at a temperature of 20° C. to 80° C. in the air.

Although not illustrated, the ITO particle-containing layer may be formed directly on the upper surface of a base material such as a transparent glass substrate or a plastic sheet instead of being formed on the upper surface of the base coat layer.

In order to obtain a desired reflectance of near infrared light, the thickness of the ITO particle-containing layer 12 is in a range of 50 to 1000 nm, preferably in a range of 50 to 500 nm, and more preferably in a range of 100 to 200 nm.

[Formation of Overcoat Layer and Infrared Light Shielding Laminate]

The overcoat layer 13 is a layer that contains silica, an acrylic resin, an epoxy resin, or a polyvinyl acetal resin. The infrared light shielding laminate 15 is obtained by forming the overcoat layer 13 on the upper surface of the ITO particle-containing layer 12.

In order to protect the ITO particle-containing layer 12, the thickness of the overcoat layer 13 is in a range of 0.1 to 100 μm, preferably in a range of 1 to 20 μm, and more preferably in a range of 5 to 10 μm.

An overcoat layer consisting of silica is prepared by the following method.

Tetraethyl orthosilicate, a methoxysilane oligomer, an ethoxysilane oligomer, or a silica sol gel solution is coated on the upper surface of the ITO particle-containing layer to form a coated film. The coated film is dried and cured at a temperature of 80° C. or higher and lower than the heatproof temperature of the base material; and thereby, an overcoat layer is formed.

The silica sol gel solution is prepared in the same manner as that for the silica sol gel solution used to form the base coat layer described above. The silica sol gel solution is diluted with ethanol such that the silica concentration is set to be in a range of 1% to 10% by mass and then used.

An overcoat layer consisting of an acrylic resin is prepared by the following method.

An acrylic resin and a polymerization initiator that initiates the reaction using heat or light are mixed with each other and then the mixture is diluted with a solvent such as alcohol, ketone, or the like to have a suitable concentration. The mixed solution is coated on the upper surface of the ITO particle-containing layer to form a coated film. The coated film is dried and then is cured by ultraviolet rays or heating; and thereby, an overcoat layer is formed.

The ratio of the amount of the polymerization initiator to the amount of the acrylic resin is preferably in a range of 0.1% to 10% by mass. The concentration of the acrylic resin (the amount of a resin in the mixed solution that contains the resin and a solvent) is preferably in a range of 10% to 70% by mass in terms of the solid content.

An overcoat layer consisting of an epoxy resin is prepared by the following method.

A main agent and a curing agent of the epoxy resin are mixed with each other at a predetermined ratio, and then the mixture is diluted with a solvent such as alcohol, ketone, or the like to have a suitable concentration. The mixed solution is coated on the upper surface of the ITO particle-containing layer to form a coated film. The coated film is dried and then is cured by heating; and thereby, an overcoat layer is formed.

The concentration of the epoxy resin (the amount of a resin in the mixed solution that contains the resin and a solvent) is preferably in a range of 10% to 70% by mass in terms of the solid content.

An overcoat layer consisting of a polyvinyl acetal resin is prepared by the following method.

The polyvinyl acetal resin is dissolved in a solvent such as alcohol, ketone, an aromatic organic solvent, or the like to have a suitable concentration. The obtained solution is coated on the upper surface of the ITO particle-containing layer to form a coated film. The coated film is dried and then is cured by heating; and thereby, an overcoat layer is formed.

In addition, a plasticizer may be added when the polyvinyl acetal resin is dissolved in a solvent.

The coating can be conducted using a typical coating device such as a slot die coater, a spin coater, an applicator, or a bar coater. The drying is conducted at a temperature of 20° C. to 80° C. in the air.

[Materials of Insulating Material, Base Coat Layer, and Overcoat Layer]

Respective materials of the above-described insulating material, the base coat layer, and the overcoat layer may be the same as or different from each other.

[Infrared Light Shielding Material]

As illustrated in FIG. 1(a), an infrared light shielding material of a first embodiment includes the infrared light shielding laminate 15 of the present embodiment and a transparent base material 16. The infrared light shielding laminate 15 is provided on the transparent base material 16 in a state in which a surface of the infrared light shielding laminate 15 on a side opposite to the overcoat layer 13 is in contact with the transparent base material 16. In other words, the infrared light shielding laminate 15 is provided on the transparent base material 16 in a state in which the lower surface of the infrared light shielding laminate 15 is in contact with the transparent base material 16.

As illustrated in FIG. 2, an infrared light shielding material of a second embodiment includes the infrared light shielding laminate 15 of the present embodiment and two transparent base materials 16 and 17. The infrared light shielding laminate 15 is interposed between the two transparent base materials 16 and 17.

The transparent base materials 16 and 17 are glass substrates or plastic sheets. The material of the plastic sheet is not particularly limited, and a material having light transmitting properties is used. Examples of the plastic sheet include a plastic film. The thickness of the glass substrate is in a range of 1 to 10 mm and preferably in a range of 2 to 7 mm. The thickness of the plastic sheet is in a range of 50 to 500 µm and preferably in a range of 100 to 300 µm.

EXAMPLES

Hereinafter, examples and comparative examples of the present invention will be described in detail.

Example 1

50 mL of an indium chloride ($InCl_3$) aqueous solution (containing 18 g of In metal) and 3.6 g of tin dichloride ($SnCl_2 \cdot 2H_2O$) were mixed to prepare a metal salt aqueous solution. The metal salt aqueous solution and an ammonia ($NH_3$) aqueous solution were simultaneously added dropwise (dripped) to 500 ml of water, and the pH of the obtained mixed aqueous solution was adjusted to 7 and then a reaction was carried out at a liquid temperature of 30° C. for 30 minutes. The generated precipitate was repeatedly subjected to decantation by using ion exchange water. The precipitate (In/Sn coprecipitated hydroxide) was separated by filtration when the resistivity of the supernatant became 50000 Ω·cm or greater. In this manner, a coprecipitated indium tin hydroxide having a color tone of reddish brown or orange-red (color of persimmons) in a dried powder state was obtained. The indium tin hydroxide which had been subjected to solid-liquid separation was dried at 110° C. for one night, and then calcined at 550° C. for 3 hours in the air. Aggregates in the calcined product were broken by pulverization, and approximately 25 g of bright yellow ITO powder having an average particle diameter of 15 nm was obtained.

Water and ethanol were mixed at a mixing ratio (mass ratio) of water:ethanol=1:3 to prepare a mixed solvent as a dispersion medium. 30 g of the ITO particles obtained in the above-described manner was added to 30 g of the mixed solvent and the solution was mixed. The ITO particles were uniformly dispersed in the mixed solution by operating a bead mill for 5 hours; and thereby, a dispersion liquid was obtained. Next, the dispersion liquid was diluted with the above-described mixed solvent of water and ethanol until the solid content concentration of the ITO particles became 1% by mass.

As a silica source to form silica serving as a shell, 6.0 g of tetraethyl orthosilicate (TEOS) was added to 500.0 g of the diluted dispersion liquid. Next, 1.5 g of a NaOH aqueous solution having a concentration of 19 M was added as an alkali source (neutralizing agent) to the mixed solution in which tetraethyl orthosilicate (TEOS) had been added. In this manner, TEOS was hydrolyzed and polymerized. Further, the neutralized dispersion liquid was washed with ultra-pure water, and then the dispersion liquid was freeze-dried. Then, the dried product was calcined at 200° C. for 60 minutes in a nitrogen environment; and thereby, core shell particles in which an ITO particle was covered by silica were obtained.

The dispersion liquid was washed by the following method so that impurities were removed from the dispersion liquid. First, the dispersion liquid was centrifuged using a centrifugal separator to remove coarse impurities. Next, the dispersion liquid was filtered using a filter made of an ion exchange resin to remove ionic impurities contained in the dispersion liquid.

4.5 g of the obtained core shell particles were dispersed in 10.5 g of ethanol using an ultrasonic homogenizer; and thereby, a dispersion liquid of core shell particles was obtained. The dispersion liquid was coated on a transparent soda-lime glass substrate having a length of 50 mm, a width of 50 mm, and a thickness of 1.1 mm at a rotational speed of 3000 rpm for 60 seconds using a spin coater. Next, the coated film was dried at 20° C. for 1 minute to form an ITO particle-containing layer having a thickness of 0.5 µm.

Next, a silica sol gel composition containing 10% by mass of $SiO_2$ was prepared. The silica sol gel composition was coated on the ITO particle-containing layer at a rotational speed of 1000 rpm for 60 seconds using a spin coater. Next, a heat treatment was conducted at 200° C. for 30 minutes to form an overcoat layer consisting of silica having a thickness of 1 µm.

The silica sol gel composition was prepared by the following method. 1.5 g of nitric acid having a concentration of 60% by mass was dissolved in 120 g of pure water to prepare a nitric acid aqueous solution. 140 g of tetraethoxysilane and 176 g of ethyl alcohol were added to a 500 $cm^3$ four-necked flask made of glass. The above-described nitric acid aqueous solution was added at once while the mixture was stirred. Next, the mixture was reacted at 50° C. for 3 hours to prepare a silica sol gel composition.

In this manner, an infrared light shielding laminate consisting of the ITO particle-containing layer and the overcoat layer was formed on a glass substrate which was a base material; and thereby, an infrared light shielding material was obtained.

Example 2

An infrared light shielding material was obtained in the same manner as in Example 1 except that the added amount of TEOS was set to 25.0 g and the amount of a NaOH aqueous solution was set to 3.0 g in the process of preparing core shell particles.

Example 3

An infrared light shielding material was obtained in the same manner as in Example 1 except that the added amount of TEOS was set to 5.5 g and the amount of a NaOH aqueous solution was set to 1.3 g in the process of preparing core shell particles.

Example 4

An infrared light shielding material was obtained in the same manner as in Example 1 except that the added amount of TEOS was set to 45.0 g and the amount of a NaOH aqueous solution was set to 1.7 g in the process of preparing core shell particles.

Example 5

The added amount of TEOS was set to 15.0 g and the amount of the NaOH aqueous solution was set to 2.2 g in the process of preparing core shell particles.

Further, an overcoat layer was formed by the following method. BEAMSET 577 (manufactured by Arakawa Chemical Industries, Ltd.) as an acrylic resin and IRGACURE 907 as an initiator were prepared. The acrylic resin and the initiator were mixed with each other such that the amount of the initiator to the amount of the acrylic resin was set to 1% by mass. The mixture of the acrylic resin and the initiator was diluted with ethanol such that the solid content concentration was set to 30% by mass to prepare a solution. The solution was coated on an ITO particle-containing layer at a rotational speed of 1000 rpm for 60 seconds using a spin coater. Next, the coated film was irradiated with ultraviolet rays to be cured; and thereby, an overcoat layer consisting of an acrylic resin was formed.

An infrared light shielding material was obtained in the same manner as in Example 1 except for the above-described processes.

Example 6

A main agent and a curing agent of an epoxy resin (MAKUSHIBU, manufactured by MITSUBISHI GAS CHEMICAL COMPANY, INC.) were respectively diluted with ethanol such that the solid content concentration was set to 30% by mass. The solution of the main agent and the solution of the curing agent were mixed with each other in an equal amount. The mixed solution was coated on an ITO particle-containing layer at a rotational speed of 1000 rpm for 60 seconds using a spin coater. Next, the coated film was heated at 90° C. for 10 minutes to be cured; and thereby, an overcoat layer consisting of an epoxy resin was formed.

An infrared light shielding material was obtained in the same manner as in Example 5 except for the above-described processes.

Example 7

Ethanol, toluene, and butanol were mixed at a mixing ratio (mass ratio) of ethanol:toluene:butanol=57:38:5 to prepare a mixed solvent. A polyvinyl butyral resin (S-LEC B, manufactured by Sekisui Chemical Co., Ltd.) was diluted with the mixed solvent such that the solid content concentration was set to 5% by mass to prepare a solution. The solution was coated on an ITO particle-containing layer at a rotational speed of 1000 rpm for 60 seconds using a spin coater. Next, the coated film was heated at 90° C. for 5 minutes to be dried and cured; and thereby, an overcoat layer consisting of a polyvinyl acetal resin was formed.

An infrared light shielding material was obtained in the same manner as in Example 5 except for the above-described processes.

Example 8

In Example 1, the ITO dispersion liquid was diluted with the mixed solvent of water and ethanol which was used as a dispersion medium until the solid content concentration of the ITO particles became 1% by mass. While 500.0 g of the diluted dispersion liquid was stirred, a diluted sulfuric acid aqueous solution was added thereto so that the pH thereof was adjusted to 4; and thereby, a suspension was obtained. Next, 15.0 g of aluminum sulfate was dissolved in 80 g of ion exchange water to prepare an aluminum sulfate aqueous solution. The aluminum sulfate aqueous solution was gradually added to the suspension and then the solution was stirred and mixed for 60 minutes. While the suspension was continuously stirred, a sodium hydroxide aqueous solution was gradually added thereto so that the pH of the suspension was adjusted to 6. Next, the suspension was stirred (aged) for 24 hours while the temperature was held to a constant value. The obtained hydrated alumina-covered ITO particles are centrifugally washed, subjected to solid-liquid separation, and then dried. In this manner, hydrated alumina-covered ITO particles were obtained. The hydrated alumina-covered ITO particles were core shell particles in which an ITO particle was covered by alumina.

An infrared light shielding material was obtained in the same manner as in Example 1 except for the above-described processes.

Example 9

Indium octylate and tin octylate were weighed such that the molar ratio of indium:tin was set to 9:1 and then mixed with each other. The mixture was dissolved in toluene. The toluene solution was dried under reduced pressure and then heated at 350° C. for 3 hours. In this manner, core shell particles in which an ITO particle was covered by an organic protective material were obtained.

5 g of the obtained core shell particles were added to 20 g of toluene and dispersed therein using an ultrasonic homogenizer; and thereby, a dispersion liquid of core shell particles was obtained. The dispersion liquid was coated on a transparent soda-lime glass substrate having a length of 50 mm, a width of 50 mm, and a thickness of 1.1 mm at a rotational speed of 1000 rpm for 60 seconds using a spin coater. Next, the coated film was dried at 120° C. for 5 minutes to form an ITO particle-containing layer having a thickness of 0.5 μm.

An infrared light shielding material was obtained in the same manner as in Example 1 except for the above-described processes.

Example 10

A PET film (LUMIRROR T-60, manufactured by Toray Industries, Inc.) was used as a base material. A thermally reactive water-based urethane resin (ELASTRON F-29, manufactured by Dai-ichi Kogyo Seiyaku Co., Ltd.) was coated on the PET film using a baker type applicator (SA-201, manufactured by TESTOR SANGYO CO., LTD.) such that the thickness of the coated film was set to 100 μm. Further, the thickness of the coated film was the thickness of the coated film in a state of containing a solvent. The coated film was dried at 80° C. for 5 minutes, and then heated at 120° C. for 3 minutes to be cured. In this manner, a base coat layer consisting of a urethane resin was formed.

An infrared light shielding material was obtained in the same manner as in Example 1 except that the PET film having this base coat layer formed on the upper surface thereof was used as a base material.

Example 11

A soda-lime glass substrate having a thickness of 1.1 mm was used as a base material. Ethanol, toluene, and butanol were mixed at a mixing ratio (mass ratio) of ethanol:toluene:butanol=57:38:5 to prepare a mixed solvent. A polyvinyl butyral resin (S-LEC B, manufactured by Sekisui Chemical Co., Ltd.) was diluted with the mixed solvent such that the solid content concentration was set to 5% by mass to prepare a solution. The solution was coated on the glass substrate using a baker type applicator (SA-201, manufactured by TESTOR SANGYO CO., LTD.) such that the thickness of the coated film was set to 100 μm. Further, the thickness of the coated film was the thickness of the coated film in a state of containing a solvent. The coated film was dried at 90° C. for 5 minutes, and then heated at 120° C. for 3 minutes to be cured. In this manner, a base coat layer consisting of a polyvinyl acetal resin was formed.

An ITO particle-containing layer was formed in the same manner as in Example 1 except that the glass substrate having this base coat layer formed on the upper surface thereof was used as a base material.

Next, a solution containing a polyvinyl butyral resin (S-LEC B, manufactured by Sekisui Chemical Co., Ltd.) was coated on the ITO particle-containing layer in the same manner as in Example 7. The coated film was dried and cured to form an overcoat layer consisting of a polyvinyl acetal resin.

A soda-lime glass substrate having a thickness of 1.1 mm was prepared as a base material. This glass substrate was placed on the overcoat layer. The glass substrate was pressure-bonded (thermocompression bonding) to an infrared light shielding laminate at 150° C. using a diaphragm type vacuum laminator. In this manner, an infrared light shielding material interposed between two soda-lime glass substrates was obtained.

Example 12

An acrylic resin was used in place of the polyvinyl butyral resin in the process of preparing the base coat layer in Example 11. BEAMSET 577 (manufactured by Arakawa Chemical Industries, Ltd.) as an acrylic resin and IRGACURE 907 as an initiator were prepared. The acrylic resin and the initiator were mixed with each other such that the amount of the initiator to the amount of the acrylic resin was set to 1% by mass. The mixture of the acrylic resin and the initiator was diluted with ethanol such that the solid content concentration was set to 30% by mass to prepare a solution. The solution was coated on the glass substrate using a baker type applicator (SA-201, manufactured by TESTOR SANGYO CO., LTD.) such that the thickness of the coated film was set to 100 μm. Further, the thickness of the coated film was the thickness of the coated film in a state of containing a solvent. The coated film was dried at 90° C. for 5 minutes, and then was irradiated with ultraviolet rays to be cured. In this manner, a base coat layer consisting of an acrylic resin was formed.

An infrared light shielding material was obtained in the same manner as in Example 11 except for the above-described processes.

Example 13

An epoxy resin (MAKUSHIBU, manufactured by MITSUBISHI GAS CHEMICAL COMPANY, INC.) was used in place of the polyvinyl butyral resin in the process of preparing the base coat layer in Example 11. The main agent and the curing agent were respectively diluted with ethanol such that the solid content concentration was set to 30% by mass. The solution of the main agent and the solution of the curing agent were mixed with each other in an equal amount. The mixed solution was coated on the glass substrate using a baker type applicator (SA-201, manufactured by TESTOR SANGYO CO., LTD.) such that the thickness of the coated film was set to 100 μm. Further, the thickness of the coated film was the thickness of the coated film in a state of containing a solvent. The coated film was heated at 90° C. for 10 minutes to be dried and cured. In this manner, a base coat layer consisting of an epoxy resin was formed.

An infrared light shielding material was obtained in the same manner as in Example 11 except for the above-described processes.

Example 14

The silica sol gel composition used in Example 1 was used in place of the polyvinyl butyral resin in the process of preparing the base coat layer in Example 11. This silica sol gel composition contained 10% by mass of $SiO_2$. The silica sol gel composition was coated on the glass substrate using a baker type applicator (SA-201, manufactured by TESTOR SANGYO CO., LTD.) such that the thickness of the coated film was set to 100 μm. Further, the thickness of the coated film was the thickness of the coated film in a state of containing a solvent. The coated film was heated at 90° C. for 5 minutes to be dried and cured. In this manner, a base coat layer consisting of silica was formed.

An infrared light shielding material was obtained in the same manner as in Example 11 except for the above-described processes.

Comparative Example 1

30 g of the ITO particles used in Example 1 were added to 30 g of the mixed solvent used in Example 1 and the solution was mixed. The ITO particles were uniformly dispersed in the mixed solution by operating a bead mill for 5 hours; and thereby, a dispersion liquid was obtained.

The dispersion liquid was coated on a transparent soda-lime glass substrate having a length of 50 mm and a width of 50 mm at a rotational speed of 3000 rpm for 60 seconds using a spin coater. Next, the coated film was dried at 20° C. for 5 minutes to form an ITO particle-containing layer having a thickness of 0.5 μm.

Next, a silica sol composition containing 10% by mass of $SiO_2$ of Example 1 was prepared. The silica sol composition of Example 1 was coated on the ITO particle-containing layer at a rotational speed of 1000 rpm for 60 seconds using a spin coater. Next, the coated film was subjected to a heat treatment at 200° C. for 30 minutes to form an overcoat layer having a thickness of 1 μm.

In this manner, an infrared light shielding material formed on the glass substrate serving as a base material was obtained. The infrared light shielding laminate included an ITO particle-containing layer and an overcoat layer consisting of silica.

<Measurement of Distance A Between ITO Particles in ITO Particle-Containing Layer>

The distance A between ITO particles in the ITO particle-containing layer of each of the infrared light shielding materials of Examples 1 to 14 and Comparative Example 1 was measured using a transmission electron microscope (TEM).

A sample for TEM observation was prepared by the following manner. First, two sheets of infrared light shielding materials were bonded to each other in a state of facing the infrared light shielding laminates using a suitable adhesive. After the adhesive was cured, the two sheets of infrared light shielding materials (sample) bonded to each other were fixed to a sample holder for polishing using a wax. Then, the sample was polished until the sample became a thin piece by performing mechanical polishing. A thin piece which was made to be sufficiently thin by mechanical polishing was obtained. Next, a mesh with a single hole was attached to the sample, and ion milling was performed on the sample until a hole was made in a part of the sample. In this manner, a sample for TEM observation was prepared.

The ITO particle-containing layer of the sample was observed by TEM. One particle and a particle closest to the particle were focused on, and then in the distance between the surfaces of two particles, the minimum distance was measured. The distance between particles was measured in 20 sites (locations). The average value of the measured values was obtained as the distance A between particles. The obtained results are listed in Table 1.

Since a shell was not present in Comparative Example 1, the ITO particles were in contact with each other.

<Measurement of Reflectance>

With regard to each of the infrared light shielding materials of Examples 1 to 14 and Comparative Example 1, the reflectance of near infrared light in a wavelength range of 800 to 2500 nm was measured using a spectrophotometer (U-4100 type (trade name), manufactured by Hitachi High-Technologies Corporation). The results thereof are listed in Table 1.

TABLE 1

| | Shell | Overcoat layer | Base coat layer | Base material and position at which laminate was formed | Distance A (nm) | Maximum value of reflectance (%) |
|---|---|---|---|---|---|---|
| Example 1 | Silica | Silica | — | On glass substrate | 0.5 | 62 |
| Example 2 | Silica | Silica | — | On glass substrate | 10 | 40 |
| Example 3 | Silica | Silica | — | On glass substrate | 0.2 | 28 |
| Example 4 | Silica | Silica | — | On glass substrate | 15 | 26 |
| Example 5 | Silica | Acrylic resin | — | On glass substrate | 6 | 54 |
| Example 6 | Silica | Epoxy resin | — | On glass substrate | 6 | 53 |
| Example 7 | Silica | Polyvinyl acetal resin | — | On glass substrate | 6 | 55 |
| Example 8 | Alumina | Silica | — | On glass substrate | 4 | 60 |
| Example 9 | Organic protective material | Silica | — | On glass substrate | 2 | 58 |
| Example 10 | Silica | Silica | Urethane resin | On PET film | 0.5 | 64 |
| Example 11 | Silica | Polyvinyl acetal resin | Polyvinyl acetal resin | Between glass substrates | 0.5 | 63 |
| Example 12 | Silica | Polyvinyl acetal resin | Acrylic resin | Between glass substrates | 0.5 | 64 |
| Example 13 | Silica | Polyvinyl acetal resin | Epoxy resin | Between glass substrates | 0.5 | 62 |
| Example 14 | Silica | Polyvinyl acetal resin | Silica | Between glass substrates | 0.5 | 65 |
| Comparative Example 1 | — | Silica | — | On glass substrate | 0 | 22 |

<Evaluation>

With regard to the infrared light shielding material of Comparative Example 1, the reflectance was 22%, which was low. It was considered that the reflectance was low because the surface of the ITO particle in the ITO particle-containing layer was not covered by an insulating material so that the ITO particles were in contact with each other and thus plasmon resonance did not occur. In contrast, with regard to the infrared light shielding materials of Examples 1 to 14, the reflectance was in a range of 26% to 65%, which was higher than the reflectance of the infrared light shielding material of Comparative Example 1. Particularly in the infrared light shielding materials of Examples 1, 2, and 5 to 14, the distances between particles were in a range of 0.5 to 10 nm and thus the reflectances were in a range of 40% to 65%, which were high.

Each of the infrared light shielding materials of Examples 1 to 14 included an ITO particle-containing layer in which core shell particles were present in a state of being in contact with each other. Therefore, it is considered that near field effects were generated, plasmon resonance light was radiated; and thereby, reflection occurred, and thus a high reflectance was obtained.

INDUSTRIAL APPLICABILITY

The infrared light shielding laminate of the present embodiment and the infrared light shielding material using the same have a high reflectance with respect to near infrared light in a wavelength range of 800 to 2500 nm. Further, the contact between the ITO particles is prevented so that the ITO particle-containing layer is not a conductive layer. For this reason, the infrared light shielding laminate of the present embodiment and the infrared light shielding material using the same exhibit radio wave transparency. Therefore, the infrared light shielding laminate of the present embodiment and the infrared light shielding material using the same can be applied to products, which need to have infrared light shielding effects, such as window glasses, sunroofs, sun visors, polyethylene terephthalate (PET) bottles, packaging films, and eyeglasses.

EXPLANATION OF REFERENCE SIGNS

10: core shell particle
10a: ITO particle
10b: insulating material
12: ITO particle-containing layer
13: overcoat layer
14: base coat layer
15: infrared light shielding laminate
16, 17: base material
20, 30: infrared light shielding material
A: distance between ITO particles

The invention claimed is:

1. An infrared light shielding laminate comprising:
an ITO particle-containing layer comprising core shell particles; and
an overcoat layer which covers an upper surface of the ITO particle-containing layer,
wherein the core shell particles are present in a state of being in contact with each other in the ITO particle-containing layer,
each core shell particle consists of an ITO particle serving as a core and an insulating material serving as a shell that covers the core,
the insulating material is an organic protective agent, and the organic protective agent is a fatty acid having a number of carbon atoms in a range of 4 to 30,
the average value of thicknesses of the shells is in a range of 0.25 to 5 nm, and
an average value of a distance between the ITO particles in a state in which the core shell particles are in contact with each other is in a range of 0.5 to 10 nm.

2. The infrared light shielding laminate according to claim 1, further comprising:
a base coat layer which covers a lower surface of the ITO particle-containing layer,
wherein the ITO particle-containing layer is interposed between the overcoat layer and the base coat layer.

3. The infrared light shielding laminate according to claim 2,
wherein the base coat layer is a layer that contains silica, a urethane resin, an acrylic resin, an epoxy resin, or a polyvinyl acetal resin.

4. An infrared light shielding material comprising:
the infrared light shielding laminate according to claim 3; and
a transparent base material,
wherein the infrared light shielding laminate is provided on the transparent base material in a state in which a surface of the infrared light shielding laminate on a side opposite to the overcoat layer is in contact with the transparent base material.

5. An infrared light shielding material comprising:
the infrared light shielding laminate according to claim 3; and
two transparent base materials,
wherein the infrared light shielding laminate is interposed between the two transparent base materials.

6. The infrared light shielding laminate according to claim 2,
wherein the overcoat layer is a layer that contains silica, an acrylic resin, an epoxy resin, or a polyvinyl acetal resin.

7. An infrared light shielding material comprising:
the infrared light shielding laminate according to claim 2; and
a transparent base material,
wherein the infrared light shielding laminate is provided on the transparent base material in a state in which a surface of the infrared light shielding laminate on a side opposite to the overcoat layer is in contact with the transparent base material.

8. An infrared light shielding material comprising:
the infrared light shielding laminate according to claim 2; and
two transparent base materials,
wherein the infrared light shielding laminate is interposed between the two transparent base materials.

9. The infrared light shielding laminate according to claim 1,
wherein the overcoat layer is a layer that contains silica, an acrylic resin, anepoxy resin, or a polyvinyl acetal resin.

10. An infrared light shielding material comprising:
the infrared light shielding laminate according to claim 9; and
a transparent base material,
wherein the infrared light shielding laminate is provided on the transparent base material in a state in which a surface of the infrared light shielding laminate on a side opposite to the overcoat layer is in contact with the transparent base material.

11. An infrared light shielding material comprising:
the infrared light shielding laminate according to claim 9; and
two transparent base materials,
wherein the infrared light shielding laminate is interposed between the two transparent base materials.

12. An infrared light shielding material comprising:
the infrared light shielding laminate according to claim 1; and
a transparent base material,
wherein the infrared light shielding laminate is provided on the transparent base material in a state in which a surface of the infrared light shielding laminate on a side opposite to the overcoat layer is in contact with the transparent base material.

13. The infrared light shielding material according to claim 12,
wherein the transparent base materials are glass substrates or plastic sheets.

14. An infrared light shielding material comprising:
the infrared light shielding laminate according to claim 1; and
two transparent base materials,
wherein the infrared light shielding laminate is interposed between the two transparent base materials.

* * * * *